United States Patent
Demange et al.

(10) Patent No.: US 7,658,437 B2
(45) Date of Patent: Feb. 9, 2010

(54) BUMPER SKIN

(75) Inventors: Jean-Yves Demange, Amberieu en Bugey (FR); Pierre Montanvert, Villeurbanne (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 11/991,574

(22) PCT Filed: Sep. 7, 2006

(86) PCT No.: PCT/FR2006/050854

§ 371 (c)(1),
(2), (4) Date: Jun. 9, 2008

(87) PCT Pub. No.: WO2007/028931

PCT Pub. Date: Mar. 15, 2007

(65) Prior Publication Data

US 2009/0115206 A1    May 7, 2009

(30) Foreign Application Priority Data

Sep. 7, 2005    (FR) .................................. 05 09133

(51) Int. Cl.
*B60R 19/04* (2006.01)

(52) U.S. Cl. ..................... 296/154; 293/102

(58) Field of Classification Search .................. 293/102, 293/154, 155
See application file for complete search history.

(56) References Cited

U.S. PATENT DOCUMENTS

| | | | | |
|---|---|---|---|---|
| 4,422,680 A | * | 12/1983 | Goupy | 293/122 |
| 6,042,163 A | * | 3/2000 | Reiffer | 293/155 |
| 6,318,775 B1 | * | 11/2001 | Heatherington et al. | 293/120 |
| 6,695,368 B1 | * | 2/2004 | Weykamp et al. | 293/154 |
| 6,733,055 B2 | * | 5/2004 | Iino | 293/142 |
| 7,255,378 B1 | * | 8/2007 | Baccouche et al. | 293/146 |
| 7,427,090 B2 | * | 9/2008 | Hodoya et al. | 293/102 |
| 7,506,919 B2 | * | 3/2009 | Fayt et al. | 296/193.09 |
| 2002/0113446 A1 | | 8/2002 | Rinklin | |

FOREIGN PATENT DOCUMENTS

DE    43 30 397 A1    3/1995
FR    2 840 573 A1    12/2003

* cited by examiner

*Primary Examiner*—Lori L Lyjak
(74) *Attorney, Agent, or Firm*—Oliff & Berridge, PLC

(57) ABSTRACT

A bumper skin made of plastics material including a front portion, at least one side overrider, and a face of the bumper skin that is visible presenting a shape irregularity between the front portion and the overrider. The front portion and the overrider are constituted by two distinct parts, at least one of the two distinct parts is linked to the shape irregularity, and the shape irregularity includes a hole passing through the bumper skin.

6 Claims, 1 Drawing Sheet

BUMPER SKIN

BACKGROUND

The present invention relates to a bumper skin made of plastics material.

Bumper skins are known that include orifices for receiving light units, such as fog lights, that are located between their front portions and their overriders.

Such skins are often made by injection molding, a manufacturing technique that is nowadays well mastered and that produces parts of shapes and dimensions that are well controlled.

The orifices provided in such parts may be obtained directly by molding or they may be obtained by punching, during a reworking operation. However even when reworking, with very few exceptions, the orifice is to be found within a shape arrangement, thereby creating a shape irregularity in the visible face of the skin.

Thus, because of the orifice itself or because of the arrangement that contains it, a shape irregularity appears in the visible face of the bumper skin, between its front portion and each of its side overriders.

For parts that are painted, such irregularities present no difficulty.

In contrast, for mass colored parts, it is observed that the plastics material has its progress within the mold cavity braked by the outlines of the irregularity and splits into at least two fronts of material that become separate on going past the irregularity. These fronts of material meet again downstream from the irregularity within the overriders, where the fronts weld together along a line of welding, also known as "knitting", thereby leaving visible faces on the overriders.

As a result, unless multiple complex and expensive proportions are taken, it is not possible to obtain a bumper skin that presents a shape irregularity between its front portion and its overriders, merely by the simple technique of injection molding a plastics material and without subsequent painting.

SUMMARY

The present invention seeks to propose a novel bumper skin that does not present that drawback.

The present invention provides a bumper skin made of plastics material, the skin comprising a front portion and at least one side overrider, said skin presenting a shape irregularity in its face that is visible between the front portion and the overrider, the skin being characterized in that the front portion and the overrider are constituted by two distinct parts, at least one of which is bounded by the shape irregularity.

Thus, the bumper skin of the invention presents no weld line in the visible faces of its overriders, because the shape irregularity no longer constitutes a brake to progress of a non-divided front of plastics material in at least that one of the two parts that is bounded by said irregularity.

In a particular embodiment of the invention, only the overrider is bounded by the shape irregularity.

In this embodiment, the front portion extends beyond the shape irregularity in the form of reinforcement forming a support for the overrider. This reinforcement can then present weld lines that result from the injected material going past the shape irregularity, but those weld lines are not visible in the skin since they are covered by the overrider which is fitted onto the reinforcement, extending the central portion.

In addition to its primary advantages, the invention also presents the following additional advantages:

its component parts are more compact, so they can be obtained using industrial tooling that is less expensive; and a greater variety of shapes and of patterns and/or colors can be combined so as to form a variety of bumpers, e.g. adapted to different versions of the same vehicle.

The present invention may also present one or more of the following characteristics:

the shape irregularity is an arrangement for a light unit;

the shape irregularity comprises a hole passing through the skin;

the front portion is made by injection molding a plastics material. It comes within the invention for only the front portion to be obtained by injection molding a plastics material, it being possible for the overrider to be obtained by any fabrication method;

the injected plastics material is mass colored; and the plastics material contains decorative particles.

BRIEF DESCRIPTION OF THE DRAWINGS

In order to make the invention better understood, there follows a description of an embodiment that does not limit the scope of the invention, and that is given with reference to the accompanying drawing.

DETAILED DESCRIPTION OF EMBODIMENTS

Figure 1:
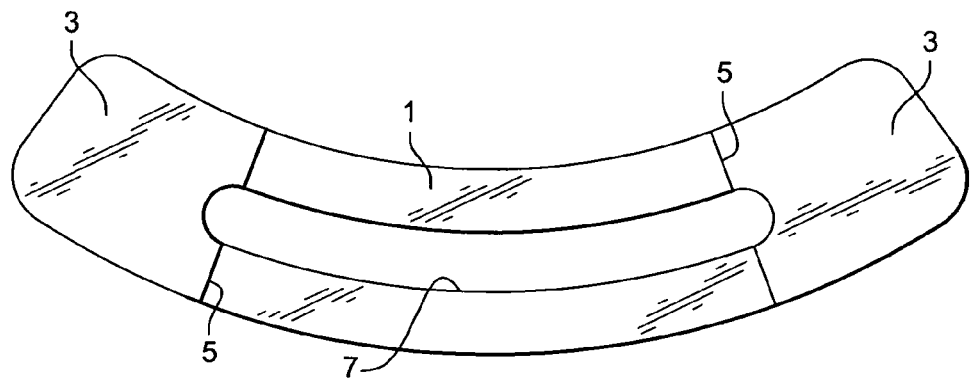
FIG. 1 is a perspective view of a bumper skin in an embodiment of the invention.

The bumper skin shown in the drawing comprises:

a front portion 1;

two side overriders 3;

respective style lines 5 between the front portion 1 and each of the side overriders 3; and a central air opening 7 extending from one overrider to the other and passing longitudinally through the central portion, thereby constituting a shape irregularity.

Figure 2:
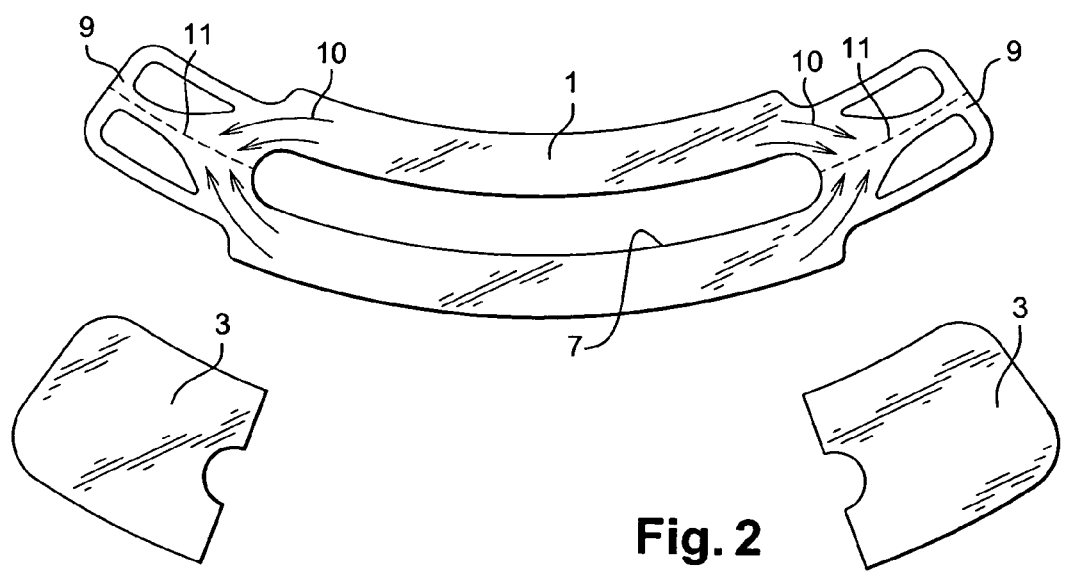
FIG. 2 is an exploded view of FIG. 1.

In the exploded view of FIG. 2, it can be seen that the two side overriders 3 and the front portion 1 constitute three distinct parts.

The front portion 1 extends sideways beyond the opening 7 in the form of reinforcement 9 occupying the location of each of the two side overriders. This front portion is obtained by injecting plastics material into a cavity within which the molten plastics material propagates from the middle towards the two reinforcements 9.

The streams of material are represented by arrows 10 in FIG. 2.

Thus, going towards either reinforcement, two fronts of material progress along the mold cavity on either side of the opening 7 and meet within the reinforcement 9.

A weld line 11 is thus formed in each reinforcement where the streams 10 meet.

Each overrider is obtained separately by a method that might likewise be injecting plastics material, and it is subsequently fitted onto the corresponding reinforcement.

The style line 5 makes it easier to juxtapose the visible zone of the front portion 1 and the two side overriders 3.

Naturally, the embodiment described above presents no limiting character and it may be modified in any desirable way without thereby going the ambit of the invention.

The invention claimed is:

1. A bumper skin made of plastics material, the bumper skin comprising:

a front portion;

at least one side overrider; and a face of the bumper skin that is visible presenting a shape irregularity between the front portion and the overrider, wherein:

the front portion and the overrider are constituted by two distinct parts, at least one of the two distinct parts is delimited by the shape irregularity, and the shape irregularity comprises a hole passing through the bumper skin.

2. The bumper skin according to claim 1, in which only the overrider is delimited by the shape irregularity.

3. The bumper skin according to claim 2, in which the front portion extends beyond the shape irregularity in a form of reinforcement forming a support for the overrider.

4. The bumper skin according to claim 1, in which the front portion is made by injection molding a plastics material.

5. The bumper skin according to claim 4, in which the injected plastics material is mass colored.

6. The bumper skin according to claim 5, in which the injected plastics material contains decorative particles.

* * * * *